3,280,037
ALKOXYLATED POLYVINYL ALCOHOL AND ALKOXYLATED AMINE COMPOSITIONS
Philip L. Gordon, Lexington, James L. Diedrich, Leominster, and Donald E. Dean, Fitchburg, Mass., assignors to The Borden Company, New York, N.Y., a corporation of New Jersey
No Drawing. Filed May 12, 1961, Ser. No. 109,528
2 Claims. (Cl. 252—90)

This invention relates to the process and product resulting from making alkoxylated polyvinyl alcohol in manner to avoid stickiness such as would cause adherence to warm processing equipment.

The invention is particularly useful and will be illustrated in connection with ethylene oxide as the alkoxylating agent and use of the product as packaging films that must withstand very low winter temperatures under conditions of low humidity, as in contact with a desiccating detergent builder salt. In such use, the plasticizing effect of the small but usually substantial water content, of alkoxylated polyvinyl alcohol films exposed to the moisture of the atmosphere, falls as the water is removed by the said salt. Under such conditions and at low winter temperatures conventional plasticized or unplasticized ethoxylated polyvinyl alcohol films shatter although sometimes so sticky at normal room temperatures as to be objectionably coherent.

The invention provides a composition of the kind described that meets the test for flexibility and crack resistance at temperatures as low as −20° F., releases readily from a rigid non-porous surface against which it has been shaped and from heated processing equipment and does not cohere objectionably when stacked.

Briefly stated the invention comprises the composition of an alkoxylated polyvinyl alcohol with a critical amount of a modifying agent that is an alkoxylated higher fatty acid amine. In the preferred embodiment the invention comprises the use of the polyvinyl alcohol of initial high viscosity and high degree of hydrolysis.

The invention is particularly useful when the alkylene oxide introduced is ethylene oxide. Other alkylene oxides may be substituted, however, in equimolecular proportions for the ethylene oxide, e.g., any $C_3$–$C_4$ alkylene oxide having therein an oxirane ring

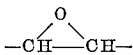

as in propylene oxide or 2,3-butylene oxide, but such substitution is not advised if all the advantages of the alkoxylation are desired.

The proportion of the alkylene oxide to be introduced is about 50–110 and for best results 80–100 parts by weight for 100 parts of the polyvinyl alcohol. When the ethylene oxide content is substantially less than 50 parts, films thereof lack the necessary crack resistance at low temperatures; when above 110 parts then the composition is sticky and films of the product cohere objectionably when stacked on each other. Whereas 50 parts of the ethylene oxide give crack resistance down to about 10° F., 80–100 parts extend the range to about −20° F.

The following table shows suitable grades of polyvinyl alcohol to be used as permissible ranges and those recommended commercially.

| Polyvinyl Alcohol | Ranges | |
|---|---|---|
| | Permissible | Recommended |
| Viscosity, cps | 40–75 | 55–65 |
| From polyvinyl acetate, hydrolyzed, percent | 92–100 | 96–99 |

The viscosity values here and elsewhere herein are for a 4% aqueous solution at a temperature of 68° F.

If the viscosity of the polyvinyl alcohol is less than 40 cps., limpness and stickiness characterize film made from the composition; if above about 75 cps., then the product tends to gel when the attempt is made to dissolve it in water for use in casting film or for other purposes. It is a surprising fact that the polyvinyl alcohol of the intermediate but relatively high viscosity of 40–75 cps., when alkoxylated and cast, gives film that is more flexible at low temperatures than film from polyvinyl alcohol of lower viscosities such as heretofore recommended for film manufacture, i.e., after alkoxylation as described herein.

A high degree of hydrolysis of the polyvinyl acetate, such as 92%–100% complete in making the polyvinyl alcohol used, is necessary to avoid objectionable amounts of by-products, discoloration, and insoluble material remaining after the alkoxylation. Particularly satisfactory products in these regards are produced when the hydrolysis of the acetate is at least 96% complete. Hydrolysis to much lower extent, as to 77%, is too low for water solubility of the finished ethoxylated polyvinyl alcohol.

The effect on viscosities of polyvinyl alcohols of various initial viscosities and percentages of the alkylene oxide introduced is illustrated by the data for the ethoxylated polyvinyl alcohol in the following table.

| Viscosity of Polyvinyl Alcohol Used, cps. | Parts of Et. Oxide for 100 of PV. Alc | Viscosity of Ethoxylated PV. Alc., cps. |
|---|---|---|
| 53 | 66 | 15.5 |
| 55 | 82 | 19 |
| 57 | 82 | 16 |
| 64 | 82 | 16.5 |

A suitable range of viscosity for the alkoxylated product is 10–25 cps.

Although any conventional alkaline catalyst of alkoxylation may be used, especially effective for our purpose are ammonia, alkyl and aryl amines, and mixtures of ammonia with the amines or other water soluble amines such as triethanolamine, triisopropanolamine, other alkanolamines and mono-, di-, and trimethyl, ethyl and butyl amines. Such lower alkanol and the alkyl amines that can be used as catalyst are the mono-, di-, and triethanolamines and any other alkanol amine having 2–5 carbon atoms in each alkanol radical and any mono-, di- and trialkyl amines having 3–10 carbon atoms to the molecule. Aryl amines also may be used.

The modifying agent is an alkoxylated higher fatty acid amine. Examples are the monoamines having a $C_{12}$–$C_{20}$ alkyl or $C_{12}$–$C_{20}$ alkylenyl group therein and being alkoxylated to the extent of about 5–50 moles of alkylene oxide for 1 mole of the amine. The alkylene oxide used is any one having an oxirane ring and 2–4 carbon atoms to the molecule. Amines that illustrate the class to be used for such alkoxylation are dodecyl, hexadecyl, octadecyl (stearyl), octadecenyl (oleyl), linoleyl, and like amines as well as mixed amines such as a blend of palmityl, oleyl and stearyl amines derived from mixed higher fatty acids in about the proportions in which those acids occur in soybean oil or other natural glyceride fat.

The modifying agent, when introduced into polyvinyl alcohol before the alkoxylation thereof, avoids difficulties otherwise experienced in the alkoxylation of the polyvinyl alcohol to the high ethoxy content. It serves as an anti-caking agent, to decrease lumping. It avoids stickiness both during the alkoxylation and later, loss of tensile strengh of film otherwise experienced with the product of the high ethoxy content in film form, and cracking to nonpermissible extent in the cold disiccated film. The product of the alkoxylation of the alcohol of kind described, in solid finely divided form in a blend with the modifying agent, is a satisfactorily granular material of good working properties on hot processing equipment that, when cast into film, is easily strippable from the surface on which cast, soluble in water, high in tensile strength such as 1,500–3,000 p.s.i., and satisfactory in crack resistance at temperatures down to 0° to −20° F., even after long contact with the detergent powder or exposure to other desiccating conditions.

The low temperature cracking or flexibility tests herein referred to are made by subjecting the film in the form of 4 sealed detergent packages, each enclosing the detergent including the partially or completely dehydrated sodium sulfate, polyphosphate or both, to shaking in a quart carton on a paint shaker and counting the ruptured packages after the shaking. This test is so much more severe than the treatment to which the packages are subjected in commerce that some ruptures in the test are permissible.

Proportions of materials introduced as such into the composition for alkoxylation are given in the table below:

| Component Used | Parts for 100 Parts of Polyvinyl Alcohol | |
|---|---|---|
| | Permissible | Recommended |
| Ammonia as 26% solution | 0–2 | 0.5–1 |
| Lower alkanol or lower alkyl amine | 0–5 | 1–3 |
| Total of above as alkoxylation catalyst | 1–6 | 1–4 |
| Modifying agent | 2–20 | 3–10 |

The percentages of the detergent packages that crack in the low temperature shaking test increases with amounts of the modifying agent above 10% on the weight of the polyvinyl alcohol used, 5% being about the optimum.

As to conditions of alkoxylation, we introduce the alkylene oxide slowly, as in gaseous form into the polyvinyl alcohol in solid finely divided form as, for instance, as particles of fineness to pass to the extent of at least 80% by weight through 100 mesh and best 90% or more through 140 mesh, in contact with the selected catalyst and at a temperature of about 60°–90° C. and ordinarily 70°–85° C. The temperature is maintained by gentle warming initially and later by cooling as the exothermic reaction develops. The introduction of the alkylene oxide, stirring of the mass either by the gas as introduced or by mechanical means and the maintenance of the temperature are continued until the proportion of the alkylene oxide introduced and combined is within the range stated above.

The whole is maintained under pressure such as 10–50 and ordinarily 20–30 p.s.i. The product contains the residues (hydroxyalkyl radicals) of the alkylene oxide used.

When this has been done, the product is bleached if decolorizing is desired, as by sulfur dioxide.

The invention will be further illustrated by the following examples, proportions here and elsewhere herein being expressed as parts by weight except where stated to the contrary.

*Example 1*

Into a pressure reaction kettle provided with agitator and means for heating and cooling there were charged the following: 50.5 parts of polyvinyl alcohol of grade 60/98, the first figure (60) being the viscosity in centipoises measured as above and the second figure (98) the degree to which the polyvinyl acetate has been hydrolyzed in conversion to the alcohol; 0.84 part of ammonium hydroxide (26% solution); and 3.68 parts of ethoxylated octadecyl amine having 20 ethylene oxide residues —$CH_2$—$CH_2O$— per mole of the amine. Ethylene oxide in total amount of 41.3 parts was then introduced in the course of about 5 hours while the temperature in the reaction vessel was maintained at 70°–75° C. and the reaction mass was continuously stirred in a dough mixer type of reaction kettle.

When the ethoxylation was completed, sulfur dioxide gas was introduced into the same vessel in the amount of about 3% of the weight of the polyvinyl alcohol used and contact of the sulfur dioxide with the material was maintained by stirring at 70° C. for 30 minutes. The product was a fine mealy powder of substantially white color. It was freely soluble in water. It parted readily from the steel equipment with which it was made.

*Example 2*

The ethoxylated polyvinyl alcohol made as described in and representing the final product of Example 1 was dissolved in water at approximately 85° C. and in the proportion of 20 parts of said product to 80 parts of water. The resulting solution was clear. It was cast into a film on a smooth horizontal steel plate. The plate and the film thereon were warmed to and maintained at 125° C. until the water was driven off. The dried film was readily stripped by hand from the plate and trimmed to size.

The trimmed film was folded into small packages. These were heat sealed on three sides, filled with a household detergent and the filling mouth itself then heat sealed. The detergent used was a mixture of a water soluble sodium salt of a sulfonated organic compound having a $C_8$–$C_{18}$ alkyl component, suitably as a substituent as in dodecyl benzene, and containing an admixed alkali metal salt such as anhydrous sodium sulfate, tetrasodium pyrophosphate, sodium tripolyphosphate or a mixture of two or more thereof, as a desiccating detergent builder salt.

The film so made was not sticky at the temperature of stripping from the plate and not self coherent when stacked at room temperatures. In the sealed detergent package, it was not brittle, i.e., it was satisfactory in rupture resistance even in contact with the detergent including the disiccating builder salt at temperatures down to −20° F.

*Example 3*

The procedure and composition of Examples 1 and 2 are followed in order except that the ethoxylated octadecyl amine there used is replaced by an equimolecular amount of the octadecyl amine ($C_{18}H_{37}$—$NH_2$) in non-ethoxylated condition and the proportion of the ethylene oxide introduced into the reaction kettle is increased by 2 parts. In this way there are obtained ethoxylation at the same time of both the polyvinyl alcohol and the amine, without the need of separate preethoxylation of the amine.

*Example 4*

The procedure and composition of Examples 1–3 are followed separately and in turn except that the ammonium hydroxide there used as catalyst is supplemented by any one of the alkanol or alkyl amines shown herein, as by triethanolamine in the amount of 3 parts. The result of the use of the combination of the hydroxide and said amine is a more even rate of ethoxylation, as shown by the heat evolution, from beginning to the end of the reaction.

*Example 5*

The procedure and composition of Example 1 are used except that the ethylene oxide is replaced in turn by equal weights of isopropylene oxide and 2,3-n-butylene oxide. The larger the number of carbon atoms in the oxide, the higher the temperature or the longer the reaction time or both that are required, e.g., up to about 85°–95° C. and 24 hours or so for the butylene oxide.

*Example 6*

The procedures and compositions of Examples 1–2 are used separately and in turn except that the ethoxylated octadecyl amine there used is replaced in turn by an equal weight of each of the equally ethoxylated other $C_{12}$–$C_{20}$ alkyl or $C_{12}$–$C_{20}$ alkenyl amines shown herein.

*Example 7*

Into a pressure reaction kettle provided with agitator and heating and cooling means, for use alternatively, there were charged the following: polyvinyl alcohol of grade 60/98, 50.5 parts; ammonium hydroxide (26% solution), 0.84 part; triethanolamine as supplementary catalyst, 3 parts; hexane as suspending liquid, 100 parts; and ethoxylated octadecyl amine having 10 ethylene oxide residues per mole, 3.68 parts. Ethylene oxide in total amount of 41.3 parts was introduced while the temperature of the materials in the reaction vessel was maintained at 70°–75° C. and at 25 p.s.i., in the course of about 5 hours. The reaction mass was continuously stirred during that time in a dough mixer.

When the ethoxylation was completed, sulfur dioxide gas was introduced into the same vessel in the amount of about 3% of the weight of the polyvinyl alcohol used and contact of the sulfur dioxide with the material was maintained by stirring at 70° C. for 30 minutes. The pressure was then released and the hexane distilled away.

In place of the hexane of this example, we may use an equal weight of another volatile hydrocarbon or like liquid that is a non-solvent for the polyvinyl alcohol and alkoxylated polyvinyl alcohol, as for example heptane, octane, benzene, toluene, and cyclohexane.

Film made from the product of this example by the casting, drying, and stripping technique described in Example 2 is resistant to cracking down to temperatures of 0° to −20° F.

It will be understood that it is intended to cover all changes and modifications of the examples of the invention herein chosen for the purpose of illustration which do not constitute departures from the spirit and scope of the invention.

We claim:
1. A packaged article wherein the material enclosed comprises:
   (1) a water soluble sodium salt of sulfonated organic detergent powder compound having components selected from the group consisting of $C_8$–$C_{18}$ alkyl; and
   (2) an anhydrous desiccating alkali metal detergent builder salt selected from the group consisting of (a) sodium sulfate, (b) tetrasodium pyrophosphate, (c) sodium tripolyphosphate and (d) mixtures thereof, and as the enclosure, a plastic characterized by water solubility, release from rigid non-porous surfaces against which the plastic is shaped, and resistance to cracking at temperatures as low as −20° F., the plastic consisting essentially of a blend of:
alkoxylated polyvinyl alcohol with an alkoxylated higher fatty acid amine,
   (i) said amine previous to alkoxylation being selected from the group consisting of (a) $C_{12}$–$C_{20}$ alkyl amines, and (b) $C_{12}$–$C_{20}$ alkenyl amines,
   (ii) the alkylene oxide represented in the alkoxylated material being a $C_2$–$C_4$ alkylene oxide having an oxirane ring,
   (iii) the proportion of the alkoxylated amine being about 2–20 parts by weight for 100 parts of the polyvinyl alcohol represented in the alkoxylated polyvinyl alcohol, and
   (iv) being in film form.

2. A packaged article as in claim 1,
   (1) the alkylene oxide:
      (a) being ethylene oxide, and
      (b) the proportion thereof being about (i) 50–110 parts by weight for 100 parts of the polyvinyl alcohol, and (ii) 5–50 mols for 1 mol of the amine,
   (2) the amine represented in the alkoxylated amine being octadecyl amine, and
   (3) the polyvinyl alcohol being the product of hydrolysis of polyvinyl acetate to the extent of about 92%–100%.

References Cited by the Examiner
UNITED STATES PATENTS

| | | | |
|---|---|---|---|
| 1,867,117 | 7/1932 | Tengler | 252—90 |
| 2,823,193 | 2/1958 | Buckmann | 260—32.6 |
| 2,850,471 | 9/1958 | Klein | 260—29.6 |
| 2,876,263 | 3/1959 | Mark | 260—32.6 XR |
| 2,891,032 | 6/1959 | Coler et al. | 260—32.6 |
| 2,908,650 | 10/1959 | Fine | 252—90 |
| 2,990,398 | 6/1961 | Inskip et al. | 260—91.3 |
| 3,070,563 | 12/1962 | Bolgiano | 260—32.6 |

FOREIGN PATENTS 510,555   3/1955   Canada.

LEON D. ROSDOL, *Primary Examiner.*

JULIUS GREENWALD, *Examiner.*

A. T. MEYERS, W. E. SCHULZ, *Assistant Examiners.*